(12) United States Patent
Heo et al.

(10) Patent No.: US 11,714,305 B2
(45) Date of Patent: Aug. 1, 2023

(54) DISPLAY APPARATUS

(71) Applicant: LG ELECTRONICS INC., Seoul (KR)

(72) Inventors: Jinha Heo, Seoul (KR); Yongnam Park, Seoul (KR); Moungyoub Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 255 days.

(21) Appl. No.: 17/275,131

(22) PCT Filed: Jan. 25, 2019

(86) PCT No.: PCT/KR2019/001074
§ 371 (c)(1),
(2) Date: Mar. 10, 2021

(87) PCT Pub. No.: WO2020/153519
PCT Pub. Date: Jul. 30, 2020

(65) Prior Publication Data
US 2022/0035194 A1 Feb. 3, 2022

(51) Int. Cl.
*G02F 1/1333* (2006.01)
*G06F 3/14* (2006.01)
*H05K 5/00* (2006.01)

(52) U.S. Cl.
CPC .... *G02F 1/133308* (2013.01); *G02F 1/13332* (2021.01); *G02F 1/133305* (2013.01); *G06F 3/14* (2013.01); *H05K 5/0017* (2013.01)

(58) Field of Classification Search
CPC .......... G02F 1/133308; G02F 1/13332; G02F 1/133305; G02F 1/133314
See application file for complete search history.

(56) References Cited

U.S. PATENT DOCUMENTS

2017/0249119 A1  8/2017  Ding
2020/0357311 A1* 11/2020  Yoon ................ G09F 9/301

FOREIGN PATENT DOCUMENTS

| KR | 1020070010583 | 1/2007 |
| KR | 101614407 | 4/2016 |
| KR | 1020160076765 | 7/2016 |
| KR | 101705512 | 2/2017 |

OTHER PUBLICATIONS

PCT International Application No. PCT/KR2019/001074, International Search Report dated Oct. 23, 2019, 4 pages.

* cited by examiner

*Primary Examiner* — Dung T Nguyen
(74) *Attorney, Agent, or Firm* — Lee Hong Degerman Kang & Waimey

(57) ABSTRACT

The present invention relates to a display apparatus. The display apparatus according to an embodiment of the present invention may comprise: at least one display unit provided with a magnet and having flexible material; and an installation frame to which the display unit is attached from the front by using magnetic force of the magnet. The installation frame may include: a base layer having a first density; a film adhered to the base layer; and a magnetic material layer adhered to the film and having a second density greater than the first density.

16 Claims, 16 Drawing Sheets

[Fig. 1]
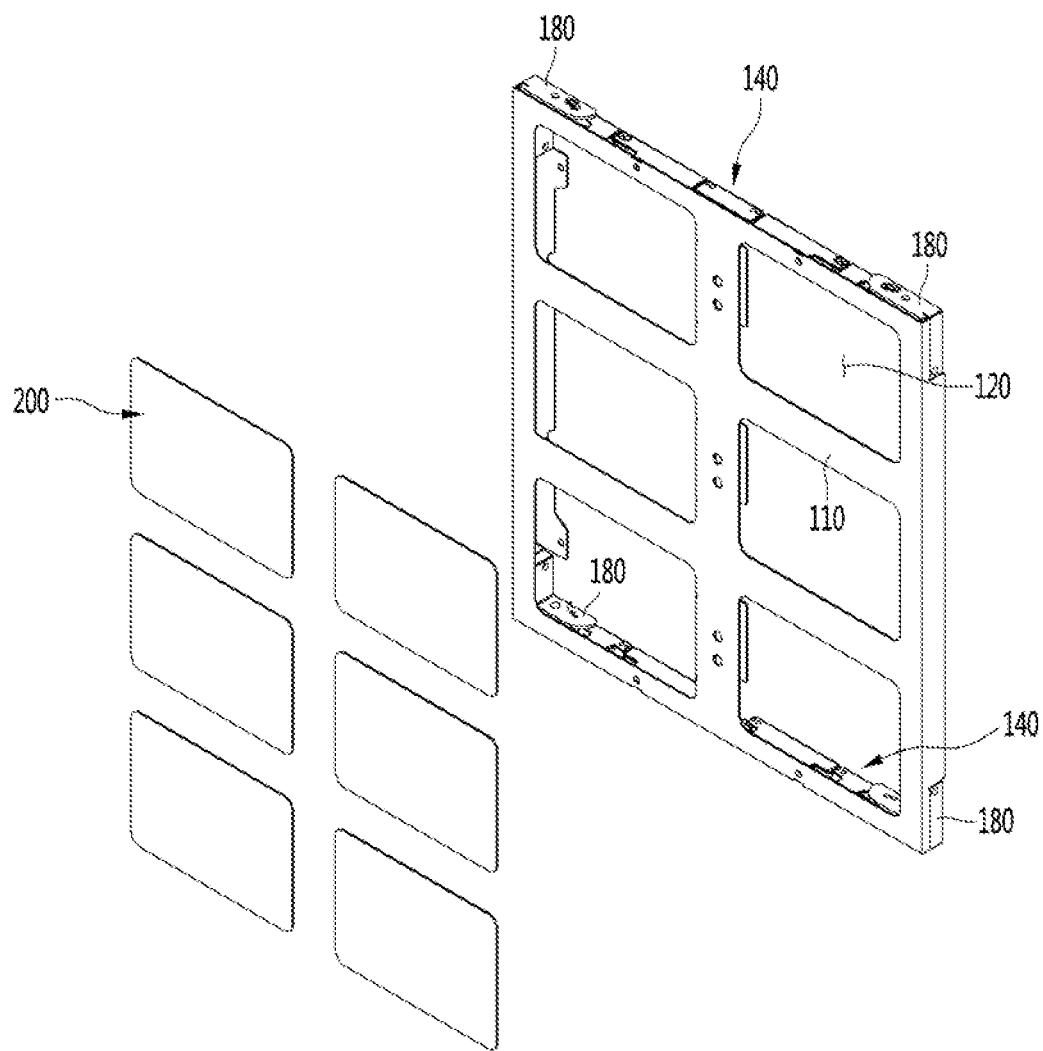

[Fig. 2]
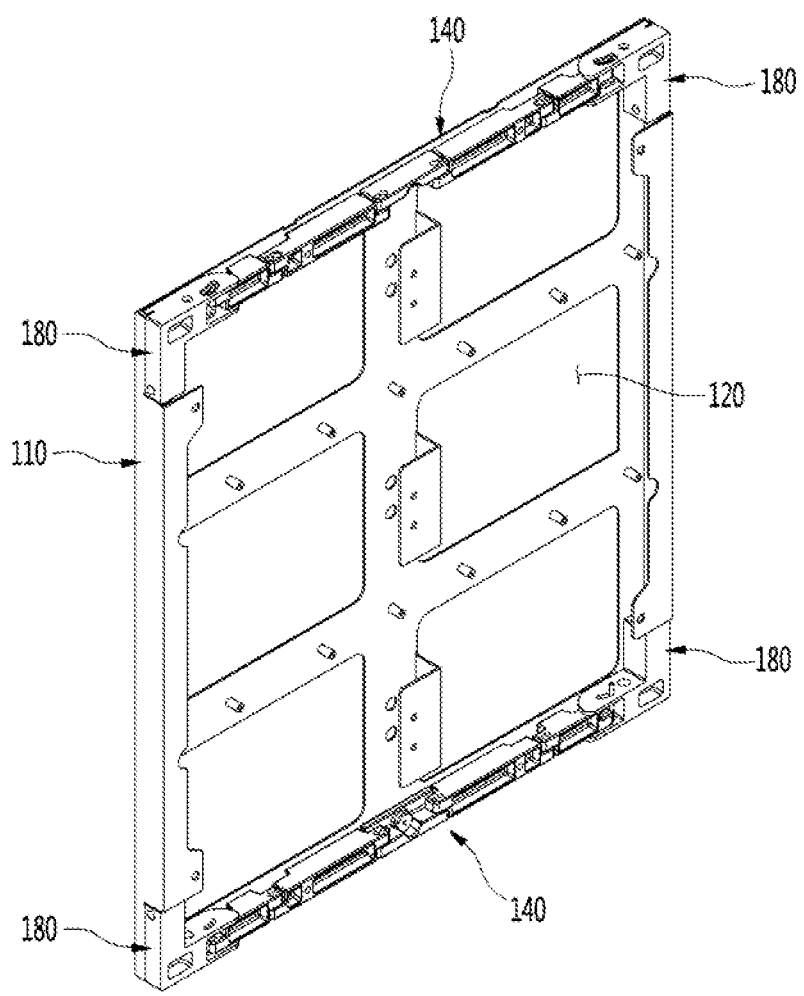

[Fig. 3]
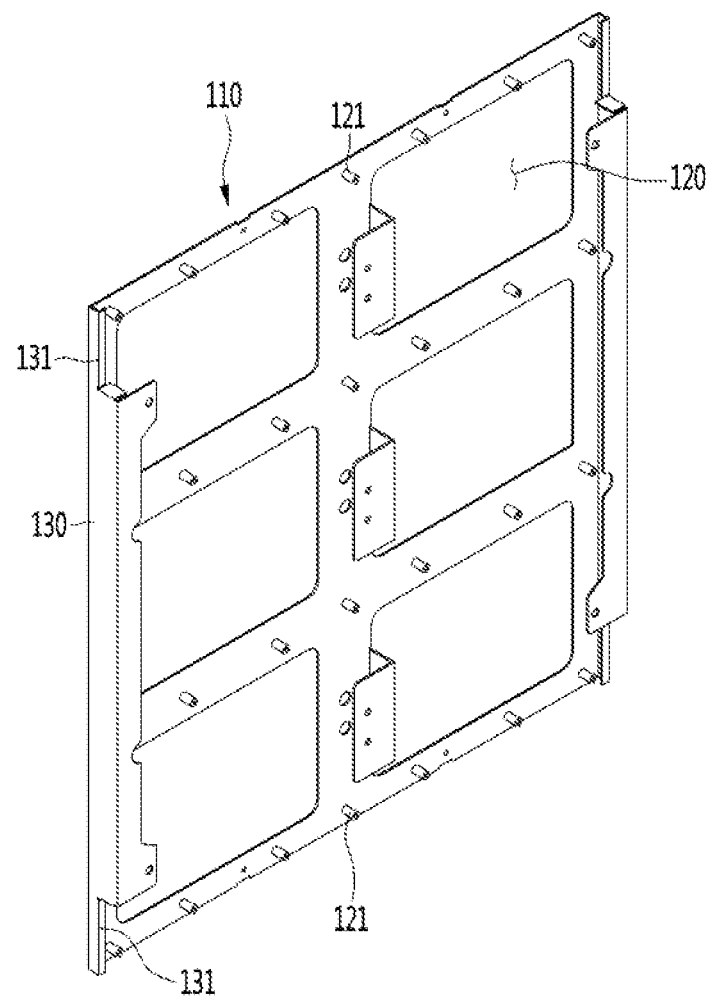

[Fig. 4]
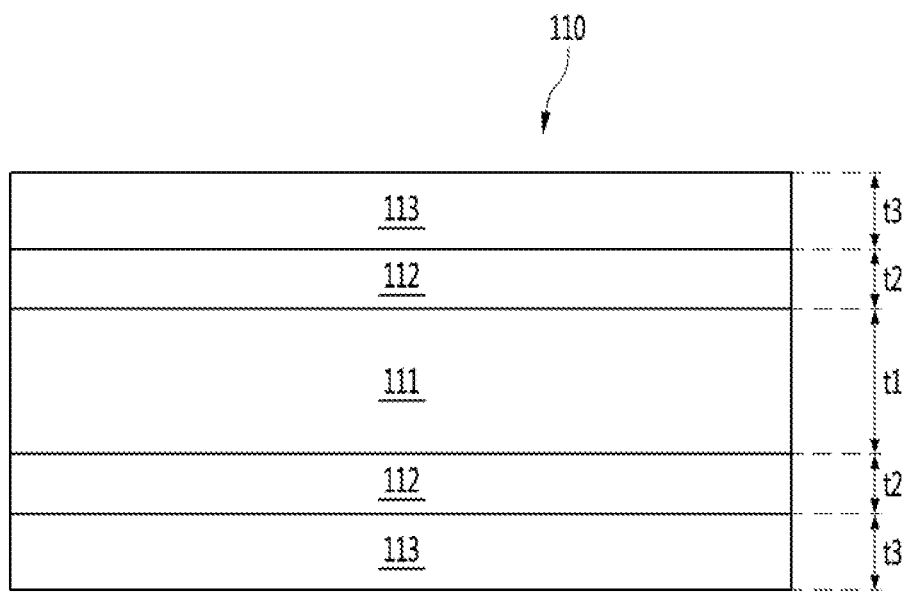

[Fig. 5]
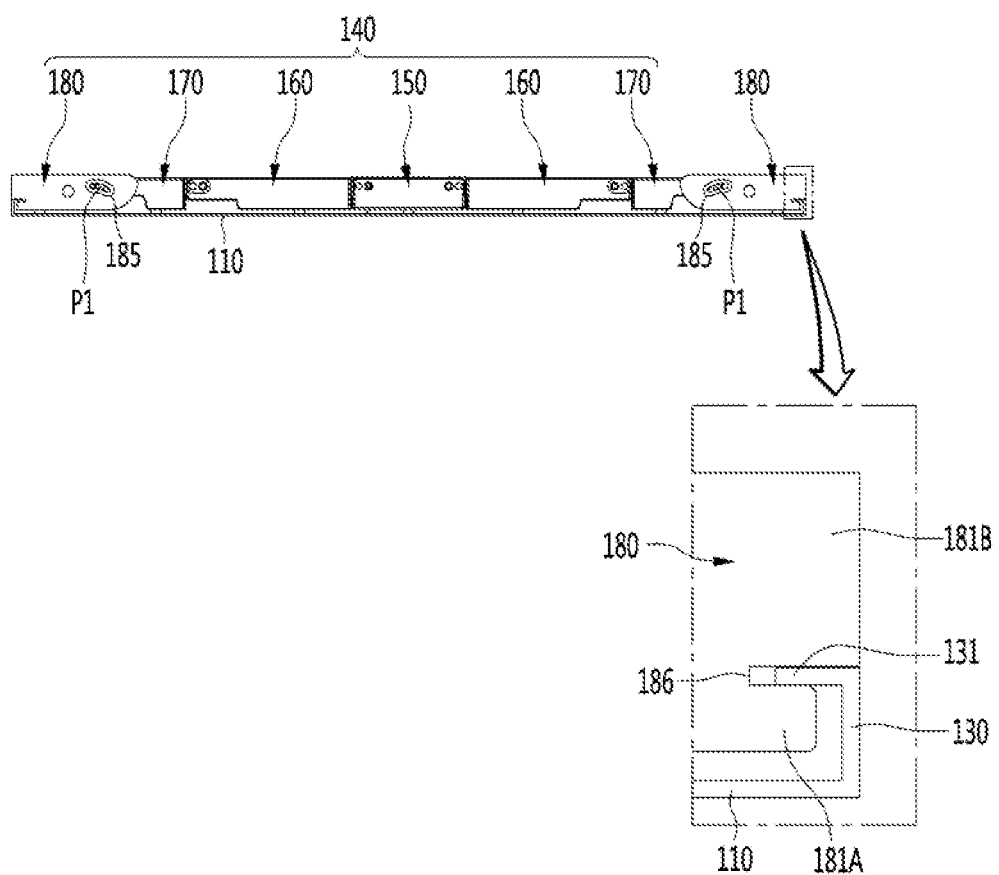

[Fig. 6]
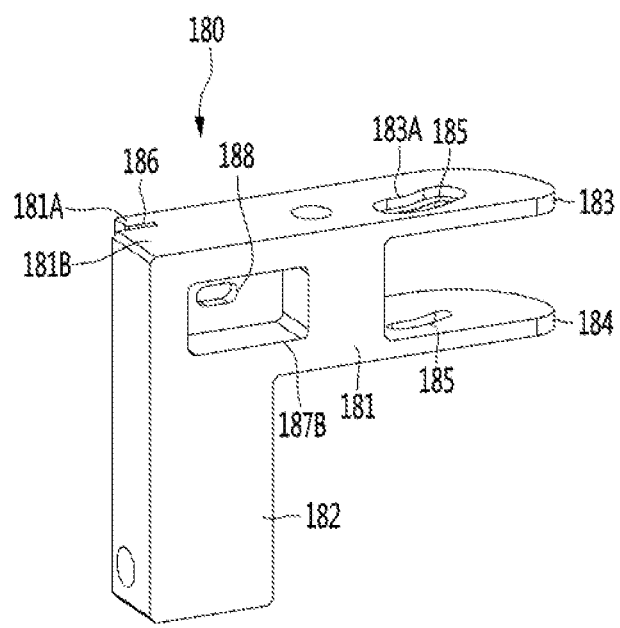

[Fig. 7]
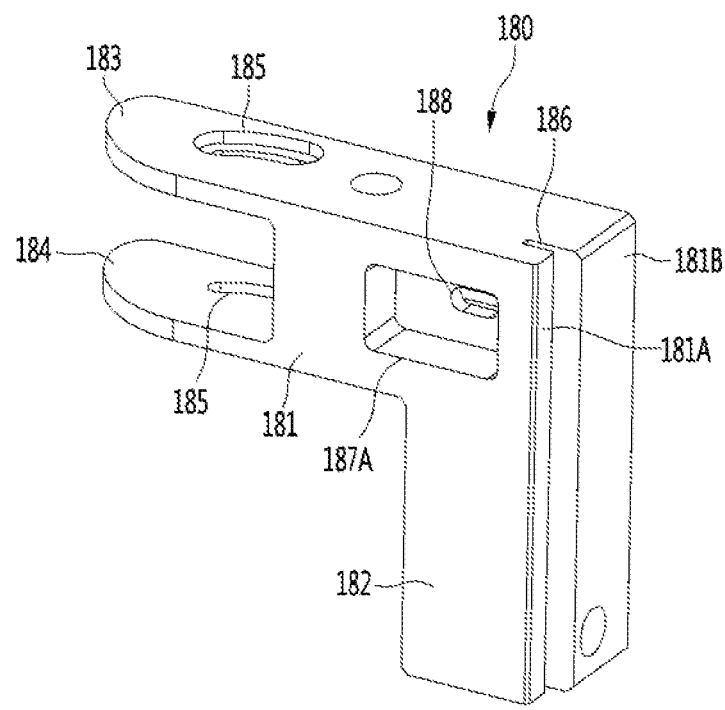

[Fig. 8]
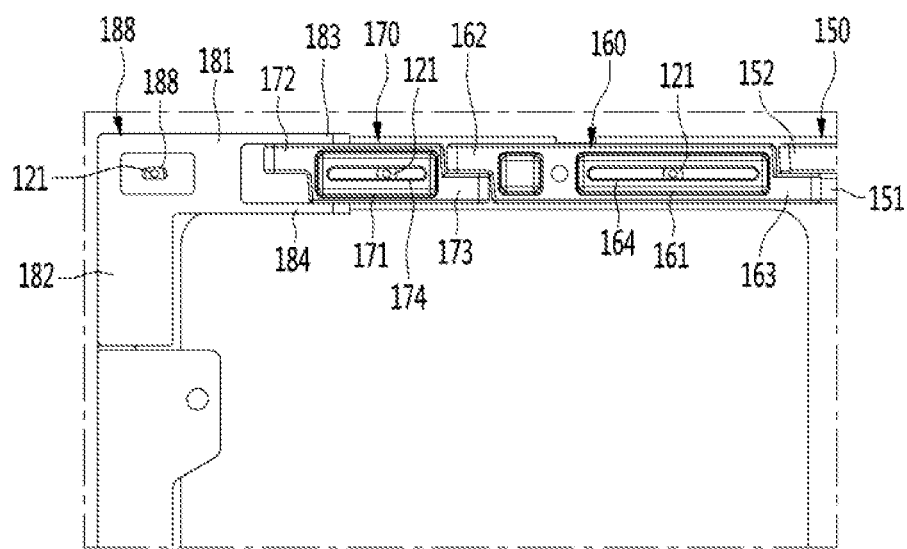

[Fig. 9]
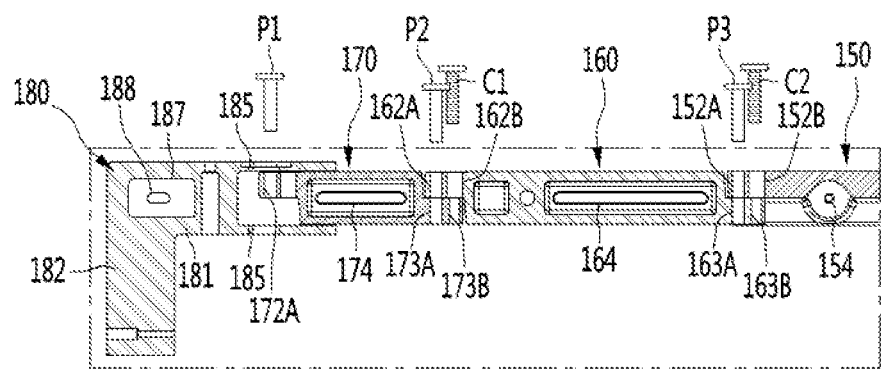

[Fig. 10]
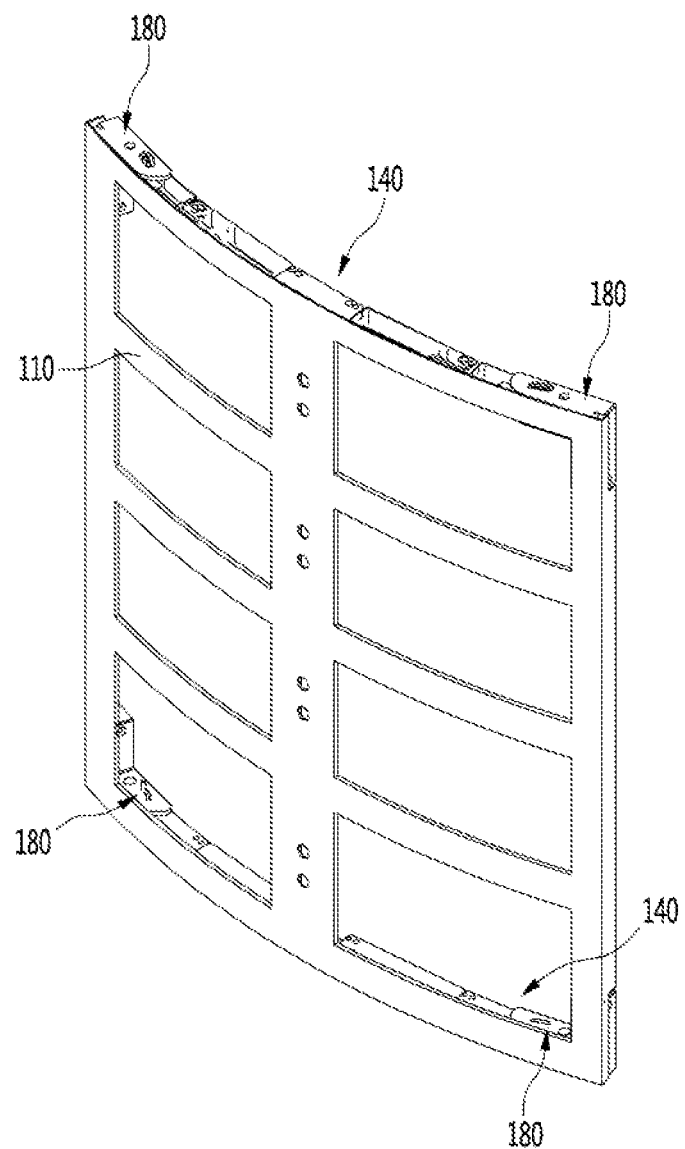

[Fig. 11]
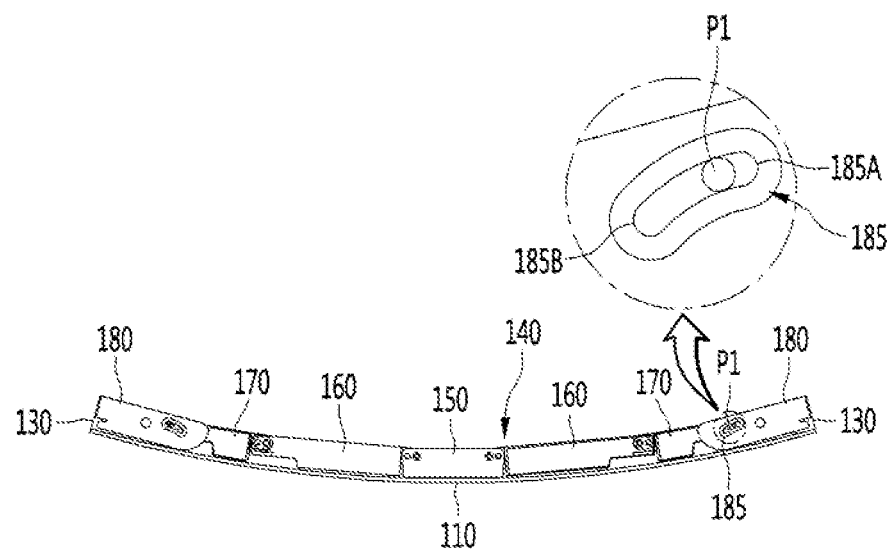

[Fig. 12]
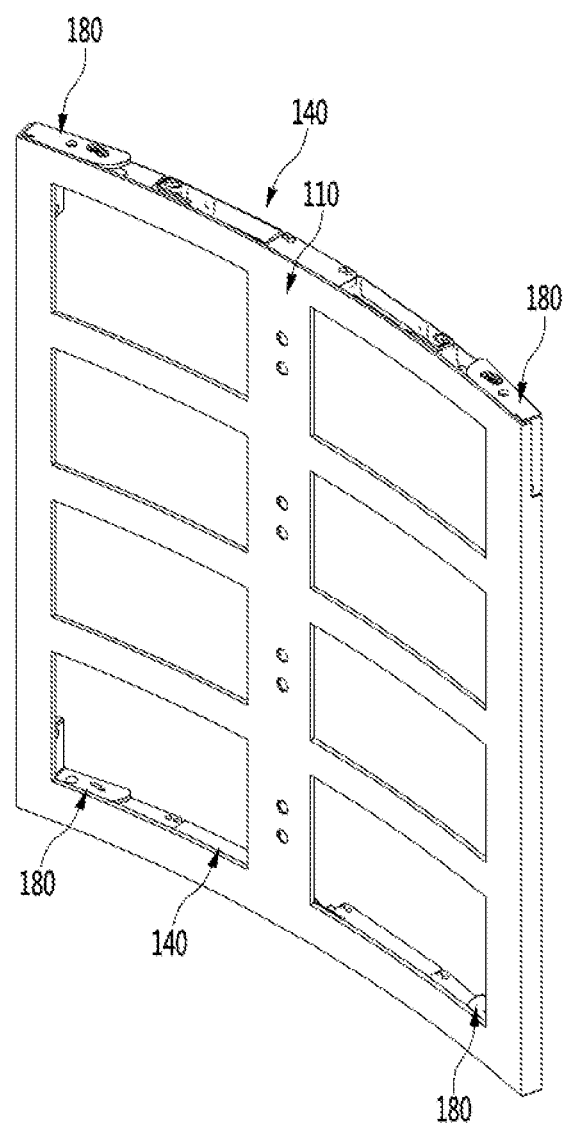

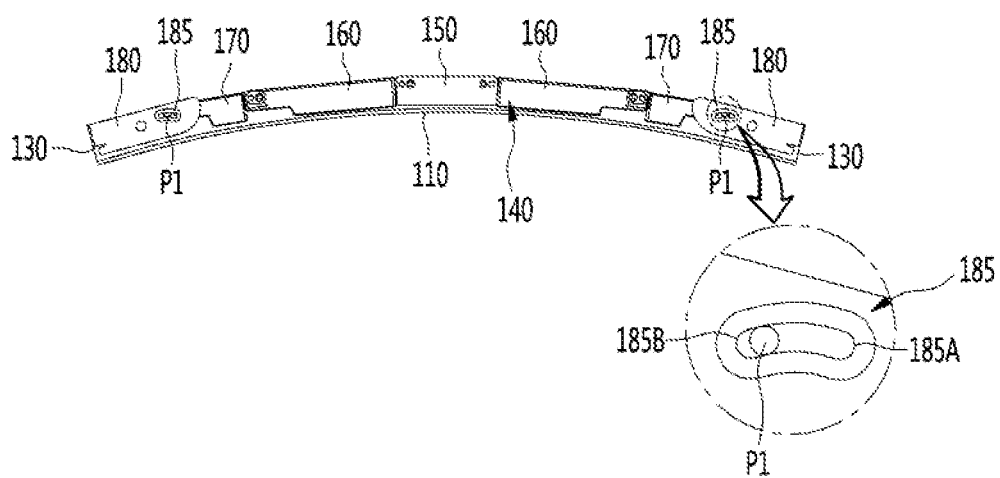
[Fig. 13]

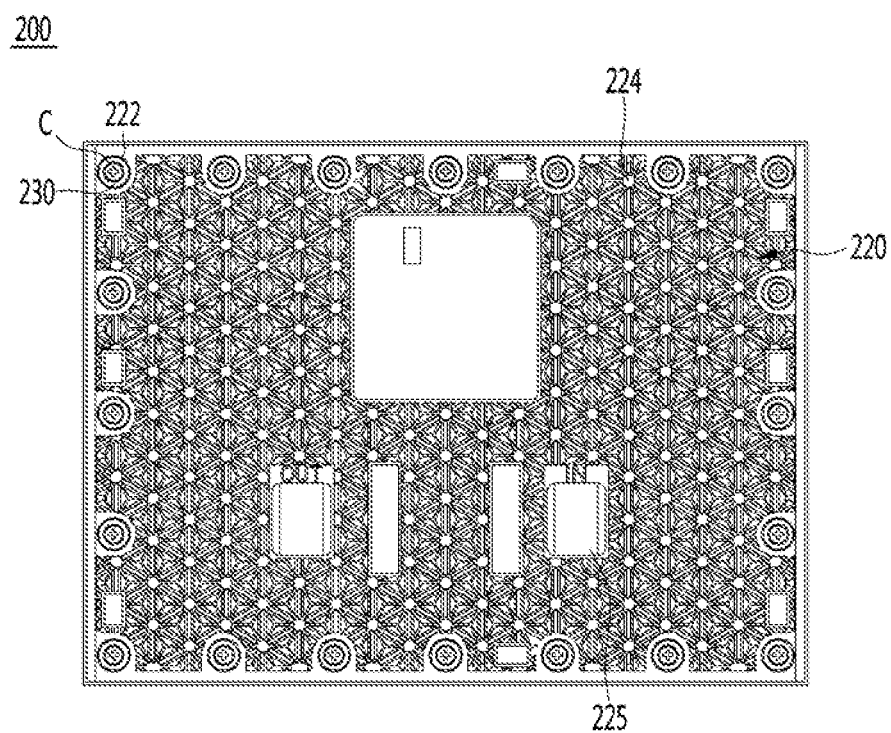
[Fig. 14]

[Fig. 15]
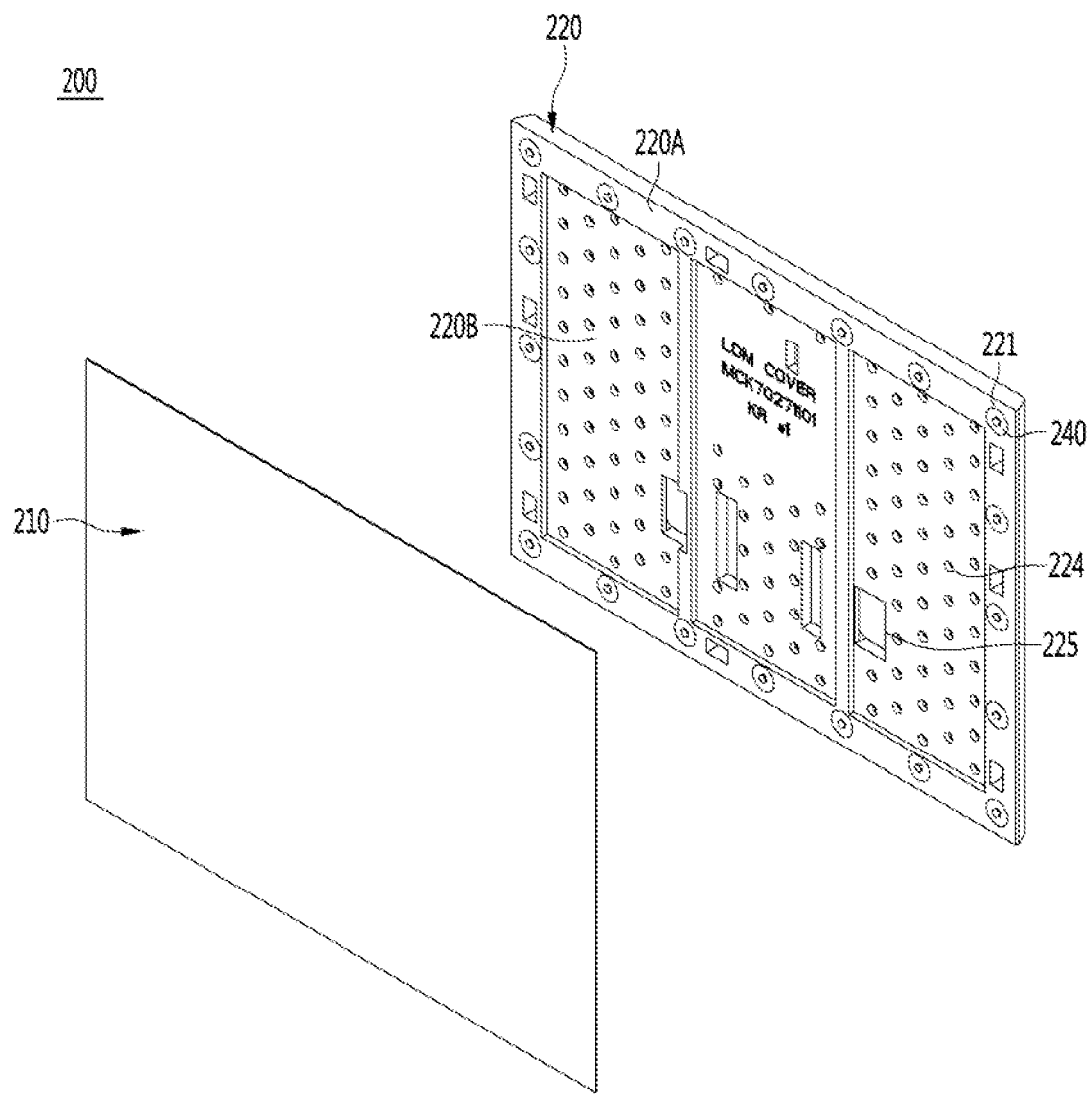

[Fig. 16]
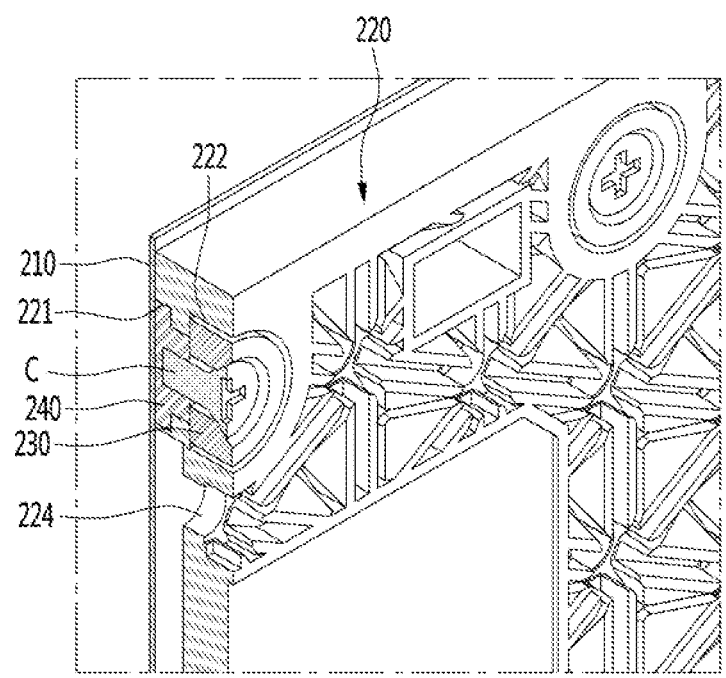

DISPLAY APPARATUS

CROSS-REFERENCE TO RELATED APPLICATIONS

This application is the National Stage filing under 35 U.S.C. 371 of International Application No. PCT/KR2019/001074, filed on Jan. 25, 2019, the contents of which are hereby incorporated by reference herein in its entirety.

TECHNICAL FIELD

The present disclosure relates to a display apparatus.

BACKGROUND ART

As our information society develops, needs for diverse forms of display apparatus are increasing. Accordingly, research has been carried out on various display apparatuses such as liquid crystal display devices (LCDs), plasma display panels (PDPs), electro luminescent displays (ELDs), vacuum fluorescent displays (VFDs), light emitting diodes (LEDs), organic light emitting diodes (OLED), and the like.

Also, recently, in the display apparatuses, screens for displaying contents have become higher in resolution and larger in size. The thickness of the display apparatus is getting thinner. Also, the display apparatus may have a curved screen.

DISCLOSURE OF THE INVENTION

Technical Problem

An object of the present invention for solving the above problem is to provide a display apparatus in which a display unit and an installation frame are easily adhered to each other regardless of a curvature of the installation frame.

Another object of the present invention for solving the above provide is to provide a display apparatus in which structural distortion does not occur during bending of an installation frame and an articulated assembly.

Technical Solution

A display apparatus according to an embodiment of the present invention may include: at least one display unit provided with a magnet and having a flexible material; an installation frame to which the display unit is attached at a front side thereof by magnetic force of the magnet. The installation frame may include: a base layer having a first density; a film adhered to the base layer; and a magnetic material layer adhered to the film and having a second density greater than the first density.

The base layer may have a thickness greater than that of the magnetic material layer.

The base layer may include a plastic material.

A pemnut may be built in the display unit, and the magnet may be fixed by a screw coupled to the pemnut.

The magnet may be adhered to the screw to rotate together with the screw.

The display unit may include: a panel; and a back cover which is disposed behind the panel and on which the magnet is mounted.

The back cover may include: a central portion in which a plurality of through-holes are defined; and an edge portion which is disposed around the central portion and on which the magnet is mounted.

A pemnut mounting groove in which the pemnut is accommodated may be defined in a front surface of the back cover, and a magnet mounting groove which is configured to communicate with the pemnut mounting groove and in which the magnet is accommodated may be defined in a rear surface of the back cover.

The back cover may include a rubber material.

A display apparatus according to an embodiment of the present invention may include: at least one display unit having a flexible material; an installation frame to which the display unit is attached at a front side thereof; a pair of bending assistant portions connected to both sides of the installation frame; an articulated assembly provided on a rear surface of the installation frame and disposed between the pair of bending assistant portions; a slot that is defined to vertically passes through the bending assistant portions and is closer to the rear surface of the installation frame toward an inside thereof; a through-hole defined to vertically pass through both sides of the articulated assembly and configured to communicate with the slot; and a connection pin fitted into the through-hole to pass through the slot.

The installation frame and the articulated assembly may be convexly bent forward, and the connection pine may be further adjacent to an outer end of an inner end and the outer end of the slot.

The installation frame and the articulated assembly may be convexly bent backward, and the connection pine may be further adjacent to an inner end of the inner end and an outer end of the slot.

The articulated assembly may be disposed on each of an upper edge and a lower edge of the installation frame.

The articulated assembly may include: a fixed body fixed to the installation frame; a pair of first connection bodies rotatably connected to both sides of the fixed body; and a pair of second connection bodies rotatably connected to sides of the pair of first connection bodies.

The second connection bodies may be connected to the bending assistant portions.

A coupling boss configured to protrude backward may be disposed on the rear surface of the installation frame, and a long hole that is elongated in a left and right direction toward the coupling boss may be defined in the bending assistant portions.

The installation frame may include: a side portion bent backward from each of both the sides of the installation frame; and a bent portion bent inward from a rear end of the side portion. A fitting groove into which the bent portion is fitted may be defined in each of the bending assistant portions.

The bending assistant portion may include: a first part disposed between the installation frame and the bent portion in a front and rear direction; and a second part disposed behind the bent portion. The second part may further protrude outward than the first part.

Advantageous Effects

According to the preferred embodiment of the present invention, the installation frame may include the magnetic material layer. Thus, even when the installation frame is bent, the display unit may be smoothly attached to the installation frame regardless of the magnet mounting position of the display unit.

In addition, the installation frame may include the base layer having the density less than that of the magnetic material layer. Therefore, there may be the advantage that the installation frame becomes lighter.

In addition, since the thickness of the base layer is thicker than that of the magnetic material layer, there may be the advantage that the installation frame becomes lighter.

In addition, the pemnut may be built in the display unit, and the magnet may be fixed by the screw coupled to the pemnut. Therefore, there may be the advantage in that the magnet is easily assembled with the display unit.

In addition, the magnet may be adhered to the screw to rotate together with the screw. Therefore, the operator may allow the screw to rotate so as to adjust the front and rear height difference between the magnet and the rear surface of the display module.

In addition, the plurality of through-holes may be defined in the back cover of the display unit. Therefore, the heat generated from the panel of the display unit may be dissipated through the through-holes. In addition, the back cover may be more flexible.

In addition, when the installation frame is bent, the connection pin may move within the slot of the bending assistant portion to compensate for the difference between the length variation between the installation frame and the length variation of the articulated assembly. Therefore, the structural distortion due to the bending of the installation frame may not occur.

In addition, the long hole may be defined in the left and right side of the bending assistant portion. Therefore, the operator may adjust the coupling position of the bending assistant portion with respect to the coupling boss when the installation frame is bent.

In addition, the bent portion of the installation frame may be fitted into the fitting groove of the bending assistant portion. Therefore, when the installation frame is bent, the occurrence of separation between both the ends of the installation frame and the bending assistant portion when the installation frame is bent.

In addition, the bending assistant portion may include the first part disposed between the installation frame and the bent portion and the second part disposed behind the bent portion. In this case, the second part may protrude further outward than the first part. Therefore, the bent portion may be easily fitted into the fitting groove without the distortion of the coupling frame.

BRIEF DESCRIPTION OF THE DRAWINGS

FIG. 1 is an exploded perspective view of a display apparatus according to an embodiment of the present invention.

FIG. 2 is a perspective view illustrating a rear surface of an installation frame according to an embodiment of the present invention.

FIG. 3 is a perspective view illustrating a state in which a bending assistant portion and an articulated assembly are removed from the installation frame according to an embodiment of the present invention.

FIG. 4 is a view illustrating an inner configuration of the installation frame according to an embodiment of the present invention.

FIG. 5 is a plan view of the bending assistant portion, the installation frame, and the articulated assembly according to an embodiment of the present invention.

FIG. 6 is a perspective view of the bending assistant portion according to an embodiment of the present invention.

FIG. 7 is a perspective view of the bending assistant portion when viewed in a different direction according to an embodiment of the present invention.

FIG. 8 is a view for explaining connection between the bending assistant portion, the articulated assembly, and the installation frame according to an embodiment of the present invention.

FIG. 9 is a cross-sectional view illustrating an inner structure of the bending assistant portion and the articulated assembly according to an embodiment of the present invention.

FIG. 10 is a perspective view illustrating a state in which the installation frame and the articulated assembly are convexly bent forward according to an embodiment of the present invention.

FIG. 11 is a plan view of the bending assistant portion, the installation frame, and the articulated assembly of FIG. 10.

FIG. 12 is a perspective view illustrating a state in which the installation frame and the articulated assembly are convexly bent backward according to an embodiment of the present invention.

FIG. 13 is a plan view of the bending assistant portion, the installation frame, and the articulated assembly of FIG. 12.

FIG. 14 is a rear view of a display unit according to an embodiment of the present invention.

FIG. 15 is an exploded perspective view of the display unit according to an embodiment of the present invention.

FIG. 16 is a view for explaining mounting of a magnet with respect to the display unit according to an embodiment of the present invention.

MODE FOR CARRYING OUT THE INVENTION

Hereinafter, detailed embodiments will be described in detail with reference to the accompanying drawings.

FIG. 1 is an exploded perspective view of a display apparatus according to an embodiment of the present invention, FIG. 2 is a perspective view illustrating a rear surface of an installation frame according to an embodiment of the present invention, and FIG. 3 is a perspective view illustrating a state in which a bending assistant portion and an articulated assembly are removed from the installation frame according to an embodiment of the present invention.

A display apparatus according to an embodiment of the present invention may include at least one display unit 200 and an installation frame 110. The display apparatus according to an embodiment of the present invention may further include an articulated assembly 140 and a bending assistant portion 180.

An image or a picture may be displayed on a front surface of the display unit 200. The display unit 200 may include an LED display.

The display unit 200 may be attached to the installation frame 110 in front of the installation frame 110.

In more detail, a magnet 230 (see FIG. 14) may be provided on a rear surface of the display unit 200. The display unit 200 may be attached to a front of the installation frame 110 by magnetic force of the magnet 230.

The display unit 200 may be provided in plurality. The plurality of display units 200 may be arranged to define at least one row and at least one column. The plurality of display units 200 may be mounted on the installation frame 110 to provide a single large display.

For example, six display units 200 may be provided, and the six display units 200 may be arranged to define three rows and two columns. The six display units 200 may be in contact with each other to provide a single large display.

A detailed configuration of the display unit 200 will be described in detail later.

The installation frame 110 may be erected vertically. The installation frame 110 may be larger than the display unit 220.

The installation frame 110 may have a substantially rectangular plate shape. The installation frame 110 may be elastically deformed to be convexly bent forward or convexly bent backward. The installation frame 110 may be bent in a horizontal direction.

At least one opening 120 penetrated in a front-rear direction may be defined in the installation frame 110. The display unit 200 may cover the opening 120 at a front side. The position and number of openings 120 may correspond to the installation position and number of display unit 200.

A control box (not shown) controlling the display unit 200 may be disposed behind the installation frame 110. A cable (not shown) connected to the control box may pass through the opening 120 and be connected to the display unit 200.

A side portion 130 and a bent portion 131 may be provided on the installation frame 110.

The side portion 130 may be provided by being bent backward from each of both sides of the installation frame 110. The side portion 130 may have an orthogonal relationship with the installation frame 110.

The bent portion 131 may be provided by being bent inward from a rear end of the side portion 130. In this case, the inward direction may mean a direction toward a rear space of the installation frame 110. In more detail, the bent portion 131 disposed on a left side portion 130 of the installation frame 110 may be bent to a right side, and the bent portion 131 disposed on a right side portion 130 of the installation frame 110 may be bent to a left side.

The bent portion 131 may be disposed behind upper and lower ends of both edges of the rear surface of the installation frame 110.

For example, the side portion 130 may be provided by bending both front sides of the installation frame 110 backward. In this case, the bent portion 131 may be provided by bending each of an upper portion including the upper end of the side portion 130 and a lower portion including the lower end of the side portion 130 inward.

In addition, a plurality of coupling bosses 121 may be disposed on the rear surface of the installation frame 110. Each of the coupling bosses 121 may protrude backward from the rear surface of the installation frame 110. The articulated assembly 140 may be coupled to the coupling boss 121 and then coupled to the installation frame 110.

The plurality of coupling bosses 121 may define at least one row.

In more detail, the plurality of coupling bosses 121 may include a plurality of upper coupling bosses disposed at portions adjacent to the upper end of the rear surface of the installation frame 110 and a plurality of lower coupling bosses disposed at portions adjacent to the lower end of the rear surface of the installation frame 110. The plurality of upper coupling bosses 121 may be horizontally disposed in a straight line and may be horizontally spaced apart from each other. The plurality of lower coupling bosses 121 may be horizontally disposed in a straight line and may be horizontally spaced apart from each other.

The articulated assembly 140 may be coupled to the rear surface of the installation frame 110. The articulated assembly 140 may be bent together with the installation frame 110.

The articulated assembly 140 may reinforce the installation frame 110.

The articulated assembly 140 may be elongated horizontally. Thus, the articulated assembly 140 may be bent in the horizontal direction.

Both ends of the articulated assembly 140 may be connected to the bending assistant portion 180. That is, the articulated assembly 140 may be disposed between the pair of bending assistant portions 180.

The articulated assembly 140 may be coupled to each of an upper edge area and a lower edge area of the rear surface of the installation frame 110. The articulated assembly 140 coupled to the upper edge area of the rear surface of the installation frame 110 may be coupled to the upper coupling boss 121. The articulated assembly 140 coupled to the lower edge area of the rear surface of the installation frame 110 may be coupled to the lower coupling boss 121. However, the mounting position of the articulated assembly 140 is not limited thereto.

The bending assistant portion 180 may be coupled to the rear surface of the installation frame 110. The pair of bending assistant portions 180 may be disposed on both sides of the articulated assembly 140. The pair of bending assistant portions 180 may be connected to both ends of the articulated assembly 140, respectively.

Thus, the articulated assembly 140 may be bent between the pair of bending assistant portions 180.

Also, the pair of bending assistant portions 180 may be connected to both the sides of the installation frame 110. In more detail, each of the bending assistant portions 180 may be connected to a bent portion 131 disposed on the installation frame 110.

Detailed configurations of the articulated assembly 140 and the bending assistant portion 180 will be described in detail later.

FIG. 4 is a view illustrating an inner configuration of the installation frame according to an embodiment of the present invention.

The installation frame 110 may include a base layer 111, a film 112, and a magnetic material layer 113.

The base layer 111 may be disposed inside the installation frame 110.

The magnetic material layer 113 may define an outer surface of the installation frame 110.

The film 112 may attach the magnetic material layer 113 to the base layer 111. That is, the film 112 may be adhered to the base layer 111, and the magnetic material layer 113 may be adhered to the film 112. The film 112 may be disposed between the magnetic material layer 113 and the base layer 111.

The magnetic material layer 113 may be attached to both sides of the base layer 111. That is, the film 112 may be adhered to each of both surfaces of the base layer 111, and the magnetic material layer 113 may be adhered to each of the films 112.

Magnetic force of the magnet 230 (see FIG. 14) mounted on the display unit 200 may act on the magnetic material layer 113. That is, the magnet 230 may be adhered to the magnetic material layer 113 by the magnetic force.

For example, the magnetic material layer 113 may include a steel material.

Thus, even when the installation frame 110 is bent, the display unit 200 may be smoothly attached to the installation frame 110 regardless of the mounting position of the magnet 230 of the display unit 200.

Also, the base layer 111 may have a first density, and the magnetic material layer 113 may have a second density greater than the first density. That is, the base layer 111 may be made of a material that is relatively lighter than that of the magnetic material layer 113. For example, the base layer 111 may include a plastic material. Thus, there is an advantage that the installation frame 110 is reduced in weight.

A thickness t1 of the base layer 111 may be thicker than a thickness t3 of each of the magnetic material layers 113. Also, a thickness t2 of each of the films 112 may be thinner than the thickness t1 of the base layer 111 and the thickness t3 of each of the magnetic material layers 113.

For example, the thickness t1 of the base layer 111 may be 0.5 mm, the thickness t2 of each of the films 112 may be 0.05 mm, and the thickness t3 of each of the magnetic material layers 113 may be 0.3 mm.

FIG. 5 is a plan view of the bending assistant portion, the installation frame, and the articulated assembly according to an embodiment of the present invention, FIG. 6 is a perspective view of the bending assistant portion according to an embodiment of the present invention, FIG. 7 is a perspective view of the bending assistant portion when viewed in a different direction according to an embodiment of the present invention, FIG. 8 is a view for explaining connection between the bending assistant portion, the articulated assembly, and the installation frame according to an embodiment of the present invention, and FIG. 9 is a cross-sectional view illustrating an inner structure of the bending assistant portion and the articulated assembly according to an embodiment of the present invention.

The articulated assembly 140 may include a fixed body 150 and a plurality of pairs of connection bodies 160 and 170. However, hereinafter, a case in which the articulated assembly 140 includes a pair of first connection bodies 160 and a pair of second connection bodies 170 will be described as an example.

The fixed body 150 may be fixed to the installation frame 150.

The pair of first connection bodies 160 may be rotatably connected to both sides of the fixed body 150, respectively. Each of the second connection bodies 170 may be rotatably connected to side portions of each of the first connection bodies 160. Also, each of the second connection bodies 170 may be rotatably connected to an inner portion of each of the bending assistants 180.

As the installation frame 110 is bent, the first connection body 160 may rotate with respect to the fixed body 150 at a predetermined angle, and the second connection body may rotate with respect to the first connection body at a predetermined angle. That is, the articulated assembly 140 may be bent to correspond to the bending of the installation frame 110.

The bending assistant portion 180 may be rotatably connected to an end of the articulated assembly 140. In more detail, a slot 185 may be defined to vertically pass through the bending assistant portion 180, and a through-hole 172A communicating with the slot 185 may be defined in the articulated assembly 140.

A connection pin P1 may connect the bending assistant portion 180 to the articulated assembly 140. The connection pin P1 may be inserted into the through-hole 172A to pass through the slot 185.

The slot 185 may be closer to the rear surface of the installation frame 110 toward the inside. That is, the slot 185 may have a shape that is closer to the rear surface of the installation frame 110 toward the articulated assembly 140.

Therefore, when the installation frame 110 is flat, a front and rear distance from the rear surface of the installation frame 110 to an inner end 185B (see FIG. 11) of the slot 185 may be closer than a front and rear distance from the rear surface of the installation frame 110 to an outer end 185A (see FIG. 11) of the slot 185.

When the installation frame 110 is bent, a length variation of the installation frame 110 may not correspond to a length variation of the articulated assembly 140. This is because a bending curvature of the installation frame 110 and a bending curvature of the articulated assembly 140 are different from each other.

When the installation frame 110 is bent, the connection pin P1 may move to the inner end 185B or the outer end 185A of the slot 185 according to the bending direction of the installation frame 110. That is, when the installation frame 110 is bent, the connection pin P1 may move within the slot 185 of the bending assistant portion 180 to compensate a difference between the length variation of the installation frame 110 and the length variation of the articulated assembly 140.

Thus, even if the installation frame 110 is bent, an orthogonal relationship between the side portion 130 and the installation frame 110 may be maintained. That is, structural distortion due to the bending of the installation frame 110 may not occur.

Also, a fitting groove 186 into which the bent portion 131 is inserted may be defined in the bending assistant portion 180. The fitting groove 186 may be defined in the outer surface of the bending assistant portion 180. The bent portion 131 may be fitted into the fitting groove 186 from the outside of the fitting groove 186.

Even if the installation frame 110 is bent, the bent portion 131 may be maintained in the state of being fitted into the fitting groove 186. Therefore, when the installation frame 110 is bent, it may be prevented that a separation occurs between both ends of the installation frame 110 and the bending auxiliary unit 180.

Referring to FIG. 6, the bending assistant portion 180 may be a block having an approximately "¬" shape. In more detail, the bending assistant portion 180 may include a main body 181, which is elongated horizontally, and a lower body 182 that is elongated downward from one side of the main body 181.

An outer surface of the lower body 182 may be continuously connected to an outer surface of the main body 181 without being stepped. An inner surface of the lower body 182 may be connected to a bottom surface of the main body 181.

The fitting groove 186 may be defined to be elongated vertically from a top surface of the main body 181 to a bottom surface of the lower body 182. That is, the fitting groove 186 and the bent portion 131 may be provided to be sufficiently elongated. Accordingly, when the installation frame 110 is bent, force applied by the fitting groove 186 to the bent portion 131 may be distributed, and the bent portion 131 may be prevented from being excessively bent.

An upper protrusion 183 and a lower protrusion 184 may be disposed at an inner side portion of the main body 181. The upper protrusion 183 and the lower protrusion 184 may protrude inward from the inner side portion of the main body 181.

The upper protrusion 183 and the lower protrusion 184 may be vertically spaced apart from each other. An end of the articulated assembly 140 may be inserted between the upper protrusion 183 and the lower protrusion 184.

A top surface of the upper protrusion 183 may be continuously connected to a top surface of the main body 181 without being stepped. A bottom surface of the lower protrusion 184 may be continuously connected to a bottom surface of the main body 181 without being stepped.

The slot 185 may be defined in each of the upper protrusion 183 and the lower protrusion 184. The slot 185 may be defined by vertically passing through the upper protrusion 183 and the lower protrusion 184. The slot 185 defined in the upper protrusion 183 and the slot 185 defined in the lower protrusion 184 have the same shape and may overlap vertically each other.

A stepped portion 183A may be disposed on the upper protrusion 183. The stepped portion 183 may be stepped downward with respect to the top surface of the upper protruding portion 183.

The slot 185 defined in the upper protrusion 183 may be defined inside the stepped portion 183A. A size of the stepped portion 183A may be larger than that of the slot 185. Thus, a head of the connection pin P1 inserted into the slot 185 may be disposed within the stepped portion.

The bending assistant portion 180 may include a first part 181A disposed in front of the fitting groove 186 and a second part 181B disposed behind the fitting groove 186.

As illustrated in FIG. 5, when the bent portion 131 is inserted into the fitting groove 186, the first part 181A may be disposed between the installation frame 110 and the bent portion 131 in the front and rear direction, and the second part 181B may be disposed behind the bent portion 131.

A portion of an upper side of each of the first part 181A and the second part 181B may be included in the main body 181, and a portion of a lower side may be included in the lower body 182.

The second part 181B may protrude further outward than the first part 181A. An outer surface of the second part 181B and an outer surface of the first part 181A may be stepped in the left and right direction. Thus, the bent portion 313 may be easily fitted into the fitting groove 186 without distortion of the coupling frame 110.

A long hole 188 facing the coupling boss 121 of the installation frame 110 may be defined in the bending assistant portion 180. The long hole 188 may be defining by passing the bending assistant portion 180 in the front and rear direction.

A coupling member (not shown) such as a screw may pass through the long hole 188 and be coupled to the coupling boss 187.

In more detail, a front recessed portion 187A recessed backward may be defined in a front surface of the bending assistant portion 180. A rear recessed portion 187B recessed forward may be defined in a rear surface of the bending assistant portion 180. The long hole 188 may be defined to pass through from the front recessed portion 187A to the rear recessed portion 187B in the front and rear direction.

At least a portion of the coupling boss 111 may be disposed inside the front recessed portion 187A. That is, the front recessed portion 187A may prevent an interference between the coupling boss 111 and the bending assistant 1 from occurring.

The head of the coupling member (not shown) that passes through the long hole 188 and is coupled to the coupling boss 11 may be disposed inside the rear recessed portion 187B.

Since the long hole 188 is defined to be elongated in the left and right direction, the coupling position of the bending assistant portion 180 with respect to the coupling boss 121 may be adjusted in the left and right direction.

In more detail, the bending assistant portion 180 may be fixed at an arbitrary point between a first position and a second position outside the first position.

Referring to FIG. 8, when the bending assistant portion 180 is disposed at the first position, the coupling member (not shown) coupled to the coupling boss 121 may be in contact with an outer end of the long hole 188. When the bending assistant portion 180 is disposed at the second position, the coupling member (not shown) coupled to the coupling boss 121 may be in contact with an inner end of the long hole 188.

Referring to FIG. 5, when the bending assistant portion 180 is disposed at the first position, the second part 181B may be disposed inside the side portion 130, and an end of the bent portion 131 may be in contact with the inner end of the fitting groove. When the bending assistant portion 180 is located in the second position, the second part 181B may protrude further outward than the side portion 130, and the end of the bent portion 131 may be spaced apart from the inner end of the fitting groove. Those skilled in the art may easily understand this description with reference to FIG. 5.

When the installation frame 110 is bent, the operator may adjust the coupling position of the bending assistant portion 180 with respect to the coupling boss 121. Thus, it is possible to compensate for the difference between the length variation of the installation frame 110 and the length variation of the articulated assembly 140.

Referring to FIGS. 8 and 9, a coupling hole 154 facing the coupling boss 121 disposed on the installation frame 150 may be defined in the fixed body 150, and the coupling member (not shown) such as the screw may pass through the coupling hole 154 and then be coupled to the coupling boss 121. Thus, the fixed body 150 may be fixed to the installation frame 110.

In more detail, the fixed body 150 may include a main body 151 having a coupling hole 154 defined therein and a rear body 152 protruding backward from an upper portion of the main body 151. The rear body 152 may be provided to be elongated in the left and right direction.

A first pin fitting hole 152A and a first screw through-hole 152B, which are vertically penetrated, may be defined in both ends of the rear body 152, respectively. The first pin fitting hole 152A may be defined outside the first screw through-hole 152B.

The first connection body 160 may include a main body 161 that is elongated in the left and right direction, a first protrusion 162 protruding outward from an outer end of the main body 161, and a second protrusion 163 protruding inward from an inner end of the main body 161.

A long hole 164 that is defined to be elongated in the left and right direction and penetrated in the front and rear direction may be defined in the main body 161. The coupling member (not shown) may pass through the long hole 164 and be coupled to the coupling member 121 of the installation frame 110. Thus, the first connection body 160 may be constricted to the installation frame 110 in the front and rear direction.

The coupling member (not shown) may pass through an arbitrary point of the long hole 164, and the position of the point may vary according to a degree of the bending of the installation frame 110. That is, since the long hole 164 is defined to be elongated in the left and right direction, the first connection body 160 may be smoothly coupled to the installation frame 110 regardless of the bending of the installation frame 110.

A second pin fitting hole 162A and a second screw through-hole 162B, which are penetrated vertically, may be defined in the first protrude 162. The second pin fitting hole 162A may be defined outside the second screw through-hole 162B.

A third pin fitting hole 163A and a first screw coupling hole 163B, which are vertically penetrated, may be defined in the second protrusion 163. The third pin fitting hole 163A may be defined outside the first screw coupling hole 163B.

The second protrusion 163 may be disposed under the rear body 152. The third pin fitting hole 163A may communicate with a lower side of the lower side of the first pin fitting hole 152A. The first screw coupling hole 163B may communicate with a lower side of the first screw passing hole 152B.

A female screw-thread corresponding to a male screw-thread disposed on an outer circumference of a screw C2 may be disposed on an inner circumference of the first screw coupling hole 163B.

The connection pin P3 may be fitted into the first pin fitting hole 152A and the third pin fitting hole 163A. Thus, the first connection body 160 may rotate with respect to the fixed body 150 using the connection pin P3 as a rotation axis.

The screw C2 may pass through the first screw through-hole 152B and may be coupled to the first screw coupling hole 163B. In this case, a head of the screw C2 may be in contact with a top surface of the fixed body 150. Thus, the first connection body 160 may be contracted to the fixed body 150 in the vertical direction.

An inner diameter of the first screw through-hole 152B may be larger than an inner diameter of the first screw coupling hole 163B. Therefore, when the first connection body 160 may rotate around a connection pin P3, the screw C2 may freely move in the horizontal direction within the first screw through-hole 152B. As a result, the rotation of the first connection body 160 with respect to the fixed body 150 may be performed smoothly.

The second connection body 170 may include a main body 171 that is elongated in the left and right direction, a third protrusion 172 protruding outward from an outer end of the main body 171, and a fourth protrusion 173 protruding inward from an inner end of the main body 171.

A long hole 174 that is defined to be elongated in the left and right direction and penetrated in the front and rear direction may be defined in the main body 171. The coupling member (not shown) may pass through the long hole 174 and be coupled to the coupling member 121 of the installation frame 110. Thus, the second connection body 170 may be constricted to the installation frame 110 in the front and rear direction.

The coupling member (not shown) may pass through an arbitrary point of the long hole 174, and the position of the point may vary according to a degree of the bending of the installation frame 110. That is, since the long hole 174 is defined to be elongated in the left and right direction, the second connection body 170 may be smoothly coupled to the installation frame 110 regardless of the bending of the installation frame 110.

A pin fitting hole 172A that is penetrated vertically may be defined in the third protrusion 172. The third protrusion 172 may be disposed between the upper protrusion 183 and the lower protrusion 184 of a bending reinforcement portion 180. The pin fitting hole 172A may communicate with each of the slots 185. The connection pin P2 may be fitted into the slot 185 and the pin fitting hole 172A. Thus, the bending assistant portion 180 may rotate with respect to the second connection body 170.

Also, as described above, when the installation frame 110 is bent, the connection pin P1 may move within the slot 185. Thus, it is possible to compensate for the difference between the length variation of the installation frame 110 and the length variation of the articulated assembly 140.

A fourth pin fitting hole 173A and a second screw coupling hole 173B, which are vertically penetrated, may be defined in the fourth protrusion 173. The fourth pin fitting hole 173A may be defined outside the second screw coupling hole 173B.

The fourth protrusion 173 may be disposed under the first protrusion 162. The fourth pin fitting hole 173A may communicate with a lower side of the second pin fitting hole 162A. The second screw coupling hole 173B may communicate with a lower side of the second screw passing hole 162B.

A female screw-thread corresponding to a male screw-thread disposed on an outer circumference of a screw C1 may be disposed on an inner circumference of the second screw coupling hole 173B.

The connection pin P2 may be fitted into the second pin fitting hole 162A and the fourth pin fitting hole 173A. Thus, the second connection body 170 may rotate with respect to the first connection body 160 using the connection pin P2 as a rotation axis.

The screw C1 may pass through the second screw through-hole 162B and may be coupled to the second screw coupling hole 173B. In this case, a head of the screw C1 may be in contact with a top surface of the first connection body 160. Thus, the second connection body 170 may be contracted to the first connection body 160 in the vertical direction.

An inner diameter of the second screw through-hole 162B may be larger than an inner diameter of the second screw coupling hole 173B. Therefore, when the second connection body 170 may rotate around a connection pin P2, the screw C1 may freely move in the horizontal direction within the second screw through-hole 162B. As a result, the rotation of the second connection body 170 with respect to the first connection body 160 may be smoothly performed.

FIG. 10 is a perspective view illustrating a state in which the installation frame and the articulated assembly are convexly bent forward according to an embodiment of the present invention, and FIG. 11 is a plan view of the bending assistant portion, the installation frame, and the articulated assembly of FIG. 10.

When the installation frame 110 and the articulated assembly 140 are convexly bent forward, a length variation of the installation frame 110 may be larger than a length variation of the articulated assembly 140.

In order to compensate for the difference in length variation, the connection pin P1 may be closer to an outer end 185A of an inner end 185B and the outer end 185A of the slot 185 defined in the bending assistant portion 180. Thus, an orthogonal relationship between the installation frame 110 and the side portion 120 may be maintained.

FIG. 12 is a perspective view illustrating a state in which the installation frame and the articulated assembly are convexly bent backward according to an embodiment of the present invention, and FIG. 13 is a plan view of the bending assistant portion, the installation frame, and the articulated assembly of FIG. 12.

When the installation frame 110 and the articulated assembly 140 are convexly bent backward, a length variation of the installation frame 110 may be less than a length variation of the articulated assembly 140.

In order to compensate for the difference in length variation, the connection pin P1 may be closer to an inner end 185B of the inner end 185B and an outer end 185A of the slot 185 defined in the bending assistant portion 180. Thus, an orthogonal relationship between the installation frame 110 and the side portion 120 may be maintained.

FIG. 14 is a rear view of a display unit according to an embodiment of the present invention, FIG. 15 is an exploded perspective view of the display unit according to an embodiment of the present invention, and FIG. 16 is a view for explaining mounting of a magnet with respect to the display unit according to an embodiment of the present invention.

A display unit 200 may include a panel 210 and a back cover 220 which is disposed behind the panel 210 and on which a magnet 230 is mounted.

The panel 210 may display an image or a picture. The panel 210 may be flexibly bent.

The back cover 220 may be disposed behind the panel 210. The back cover 220 may cover a rear surface of the panel 210. The back cover 220 may include a flexible material. For example, the back cover 220 may include a rubber material.

The back cover 220 may include an edge portion 220A and a central portion 220B.

The edge portion 220A may be disposed around the central portion 220B. That is, the edge portion 220A may be disposed in all directions of the central portion 220B.

The magnet 230 may be mounted on the edge portion 220A. The plurality of magnets 230 may be spaced apart from each other along the edge portion 220A.

A plurality of through-holes 224 may be defined in the central portion 220B. Heat generated from the panel 210 may be dissipated through the through-holes 224. Also, the back cover 220 may be more flexible by the plurality of through-holes 224.

At least one opening hole 225 may be defined in the central portion 220B. A wires or cable connected to the panel 210 may pass through the opening hole 225.

On the other hand, a pemnut 240 may be built in the display unit 200, and the magnet 230 may be fixed by a screw C coupled to the pemnut 240.

In more detail, a pemnut mounting groove 221 on which the pemnut 240 is mounted may be defined in a front surface of the back cover 220. A magnet mounting groove 222 which communicates with the pemnut mounting groove 221 and in which the magnet 230 is mounted may be defined in a rear surface of the back cover 220.

The pemnut 240 and the pemnut mounting groove 221 may be covered by the panel 210 and may not be visible from the front side.

The screw C may pass through the magnet 230 and be coupled to the pemnut 240. The magnet 230 may have a ring shape.

The magnet 230 may be adhered to the screw C to rotate together with the screw C. The magnet 230 may be adhered to the screw C by an adhesive or the like.

Therefore, when the screw C rotates in one direction, the magnet 230 may be inserted toward the magnet mounting groove 222, and when the screw C rotates in the other direction, the magnet 230 may be withdrawn from the magnet mounting groove 222.

Thus, the operator may easily adjust a height difference between the magnet 230 and the back cover 220 in the front and rear direction through the rotation of the screw C.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

The invention claimed is:

1. A display apparatus comprising:
   at least one display unit provided with a magnet and having a flexible material;
   an installation frame to which the display unit is attached at a front side thereof by magnetic force of the magnet;
   wherein the installation frame comprises:
      a base layer having a first density;
      a film adhered to the base layer; and
      a magnetic material layer adhered to the film and having a second density greater than the first density,
   wherein a pemnut is built in the display unit, and
   the magnet is fixed by a screw coupled to the pemnut.

2. The display apparatus according to claim 1, wherein the base layer has a thickness greater than a thickness the magnetic material layer.

3. The display apparatus according to claim 1, wherein the base layer comprises a plastic material.

4. The display apparatus according to claim 1, wherein the magnet is adhered to the screw to rotate together with the screw.

5. The display apparatus according to claim 1, wherein the display unit comprises:
   a panel; and
   a back cover which is disposed behind the panel and on which the magnet is mounted.

6. The display apparatus according to claim 5, wherein the back cover comprises:
   a central portion in which a plurality of through-holes are defined; and
   an edge portion which is disposed around the central portion and on which the magnet is mounted.

7. The display apparatus according to claim 5, wherein a pemnut mounting groove in which the pemnut is accommodated is defined in a front surface of the back cover, and
   a magnet mounting groove which is configured to communicate with the pemnut mounting groove and in which the magnet is accommodated is defined in a rear surface of the back cover.

8. The display apparatus according to claim 5, wherein the back cover comprises a rubber material.

9. A display apparatus comprising:
   at least one display unit having a flexible material;
   an installation frame to which the display unit is attached at a front side thereof;
   a pair of bending assistant portions connected to both sides of the installation frame;
   an articulated assembly provided on a rear surface of the installation frame and disposed between the pair of bending assistant portions;
   a slot that is defined to vertically pass through the bending assistant portions and is closer to the rear surface of the installation frame toward an inside thereof;
   a through-hole defined to vertically pass through both sides of the articulated assembly and configured to communicate with the slot; and
   a connection pin fitted into the through-hole to pass through the slot,
   wherein the articulated assembly comprises:
   a fixed body fixed to the installation frame;
   a pair of first connection bodies rotatably connected to both sides of the fixed body; and
   a pair of second connection bodies rotatably connected to sides of the pair of first connection bodies.

10. The display apparatus according to claim 9, wherein the installation frame and the articulated assembly are convexly bent forward, and
the connection pin is further adjacent to an outer end of an inner end and the outer end of the slot.

11. The display apparatus according to claim 9, wherein the installation frame and the articulated assembly are convexly bent backward, and
the connection pin is further adjacent to an inner end of the inner end and an outer end of the slot.

12. The display apparatus according to claim 9, wherein the articulated assembly is disposed on each of an upper edge and a lower edge of the installation frame.

13. The display apparatus according to claim 9, wherein the second connection bodies are connected to the bending assistant portions.

14. The display apparatus according to claim 9, wherein a coupling boss configured to protrude backward is disposed on the rear surface of the installation frame, and
a long hole that is elongated in a left and right direction toward the coupling boss is defined in the bending assistant portions.

15. A display apparatus comprising:
at least one display unit having a flexible material;
an installation frame to which the display unit is attached at a front side thereof;
a pair of bending assistant portions connected to both sides of the installation frame;
an articulated assembly provided on a rear surface of the installation frame and disposed between the pair of bending assistant portions;
a slot that is defined to vertically pass through the bending assistant portions and is closer to the rear surface of the installation frame toward an inside thereof;
a through-hole defined to vertically pass through both sides of the articulated assembly and configured to communicate with the slot; and
a connection pin fitted into the through-hole to pass through the slot,
wherein the installation frame comprises:
a side portion bent backward from each of both the sides of the installation frame; and
a bent portion bent inward from a rear end of the side portion,
wherein a fitting groove into which the bent portion is fitted is defined in the bending assistant portions.

16. The display apparatus according to claim 15, wherein the bending assistant portion comprises:
a first part disposed between the installation frame and the bent portion in a front and rear direction; and
a second part disposed behind the bent portion,
wherein the second part further protrudes outward than the first part.

* * * * *